(12) United States Patent
Bourgoin

(10) Patent No.: US 10,687,015 B2
(45) Date of Patent: Jun. 16, 2020

(54) METHOD FOR SYNCHRONIZING A FIRST AUDIO SIGNAL AND A SECOND AUDIO SIGNAL

(71) Applicant: SAGEMCOM BROADBAND SAS, Rueil Malmaison (FR)

(72) Inventor: Gilles Bourgoin, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/465,289

(22) PCT Filed: Nov. 30, 2017

(86) PCT No.: PCT/EP2017/081043
§ 371 (c)(1),
(2) Date: May 30, 2019

(87) PCT Pub. No.: WO2018/100093
PCT Pub. Date: Jun. 7, 2018

(65) Prior Publication Data
US 2019/0394421 A1 Dec. 26, 2019

(30) Foreign Application Priority Data

Nov. 30, 2016 (FR) ..................... 16 61678

(51) Int. Cl.
*H04N 5/932* (2006.01)
*H04N 5/935* (2006.01)
(Continued)

(52) U.S. Cl.
CPC ............. *H04N 5/607* (2013.01); *H04N 5/04* (2013.01); *H04R 1/22* (2013.01); *H04S 7/301* (2013.01); *H04R 2499/15* (2013.01)

(58) Field of Classification Search
USPC ................................. 386/203–204
See application file for complete search history.

(56) References Cited

U.S. PATENT DOCUMENTS

2006/0156909 A1* 7/2006 Kobayashi ........... G10H 1/0066
84/645
2006/0185504 A1* 8/2006 Kobayashi ........... G10H 1/0066
84/645
(Continued)

FOREIGN PATENT DOCUMENTS

WO WO 2009/038615 A1 3/2009

*Primary Examiner* — Nigar Chowdhury
(74) *Attorney, Agent, or Firm* — Muncy, Geissler, Olds & Lowe, P.C.

(57) ABSTRACT

A method for synchronising a first audio signal and a second audio signal coming from a same original audio signal, the method including the steps of: measuring a superimposed sound signal; performing a processing of the superimposed sound signal comprising a calculation of an intercorrelation or autocorrelation function; estimating, from a first processed signal, an absolute value of a time delay between the first audio signal and the second audio signal; modifying at least one characteristic of the first audio signal or the second audio signal; measuring again the superimposed sound signal; performing again the processing of the superimposed sound signal in order to obtain a second processed signal; estimating the sign of the time delay based on the second processed signal; synchronising the first audio signal and the second audio signal.

13 Claims, 8 Drawing Sheets

(51) Int. Cl.
    *H04N 5/60*          (2006.01)
    *H04N 5/04*          (2006.01)
    *H04R 1/22*          (2006.01)
    *H04S 7/00*          (2006.01)

(56) References Cited

U.S. PATENT DOCUMENTS

| | | |
|---|---|---|
| 2007/0220561 A1 | 9/2007 | Girardeau et al. |
| 2014/0281984 A1* | 9/2014 | Milne .................... G06F 3/048 |
| | | 715/716 |
| 2014/0376873 A1 | 12/2014 | Tanaka et al. |

\* cited by examiner

METHOD FOR SYNCHRONIZING A FIRST AUDIO SIGNAL AND A SECOND AUDIO SIGNAL

BACKGROUND OF THE INVENTION

Since the methods of digitally processing audio and the methods of digitizing video are different and since they correspond to different processing times, it is always necessary to synchronize the sound and the image produced by an audio/video source and transmitted to an audio/video playback device.

Thus, with reference to FIG. 1, an original audio/video signal Sav is transmitted by a decoder unit 1 (also known as a "set-top box") to a TV set 2, in this example via a cable 3 of high-definition multimedia interface (HDMI) type. The original audio/video signal Sav is subjected to digital audio decoding processing 4, and to video decoding processing 5, respectively producing an audio signal and an image signal Si. After the digital audio decoding processing 4, the audio signal is also subjected to synchronization processing 6 so as to be synchronized with the image signal Si. This produces an audio signal Sa1. The image signal Si and the audio signal Sa1 are then played back respectively by the screen of the TV set 2 and by the internal loudspeaker of the TV set 2.

The synchronization processing 6 is set either to be constant and specific to the TV set 2, or else is manually adjustable "by ear" by the user, or else is based on measuring a video delay by using a light source and a light sensor.

Nevertheless, with reference to FIG. 2, when a loudspeaker is used that is external to the TV set 2, e.g. a sound bar 8, the delay $\Delta t$ induced by the digital audio decoding processing 9 in order to produce the audio signal Sa2 that is to be played back by the sound bar 8 is not necessarily identical to the delay induced by the digital audio decoding processing 4 for producing the audio signal Sa1 that is to be played back by the internal loudspeaker of the TV set 2. It is therefore appropriate to synchronize these audio signals Sa1 and Sa2 so as to avoid the occurrence of a disagreeable sound offset.

OBJECT OF THE INVENTION

An object of the invention is to synchronize effectively a first audio signal played back by a first audio playback device with a second audio signal played back by a second audio playback device, the first audio signal and the second audio signal being derived from a single original audio signal.

SUMMARY OF THE INVENTION

To this end, the invention provides a synchronization method for synchronizing a first audio signal played back by a first sound playback device with a second audio signal played back by a second sound playback device, the first audio signal and the second audio signal being derived from a single original audio signal, the method comprising the steps of:

measuring a superposed audio signal resulting from playing back the first audio signal and the second audio signal;

processing the superposed audio signal in order to obtain a first processed signal, the processing comprising calculating a cross-correlation function or an auto-correlation function;

from the first processed signal, estimating an absolute value for a time shift between the first audio signal and the second audio signal;

modifying at least one characteristic of the first audio signal or of the second audio signal;

measuring the superposed sound signal once more;

performing processing once more on the superposed sound signal in order to obtain a second processed signal;

estimating the sign of the time shift from the second processed signal;

synchronizing the first audio signal and the second audio signal by applying to the first audio signal or to the second audio signal a delay time or an advance time corresponding to the time shift.

The use of a cross-correlation function or an auto-correlation function and taking account of the effect on the cross-correlation or auto-correlation function of a modification to a characteristic of the first audio signal or of the second audio signal makes it possible to synchronize accurately and effectively the first audio signal and the second audio signal.

The invention also provides a system comprising an audio/video source, an audio/video playback device, a first sound playback device integrated in the audio/video playback device, a second sound playback device, and processor means that perform the synchronization method as mentioned above.

Other characteristics and advantages of the invention appear on reading the following description of particular, non-limiting embodiments of the invention.

BRIEF DESCRIPTION OF THE DRAWINGS

Reference is made to the accompanying drawings, in which.

DETAILED DESCRIPTION OF THE INVENTION

Figure 1:
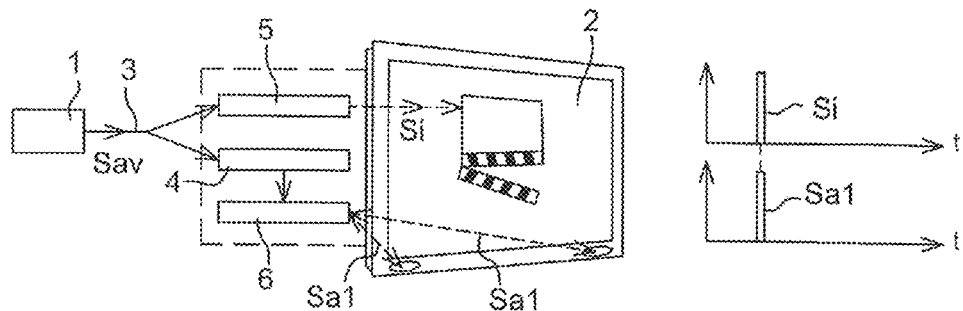
FIG. 1 shows a decoder unit, a TV set, an image signal, and an audio signal.
Figure 2:
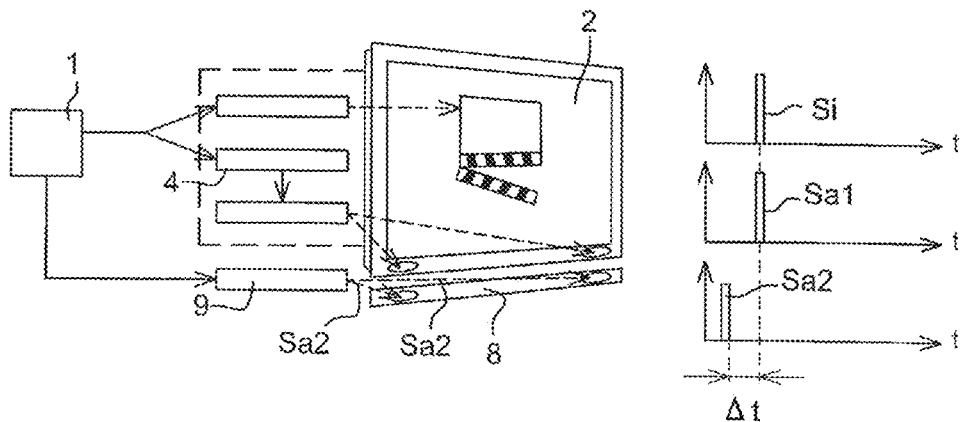
FIG. 2 shows a decoder unit, a TV set, a sound bar, an image signal, a first audio signal, and a second audio signal.
Figure 3:
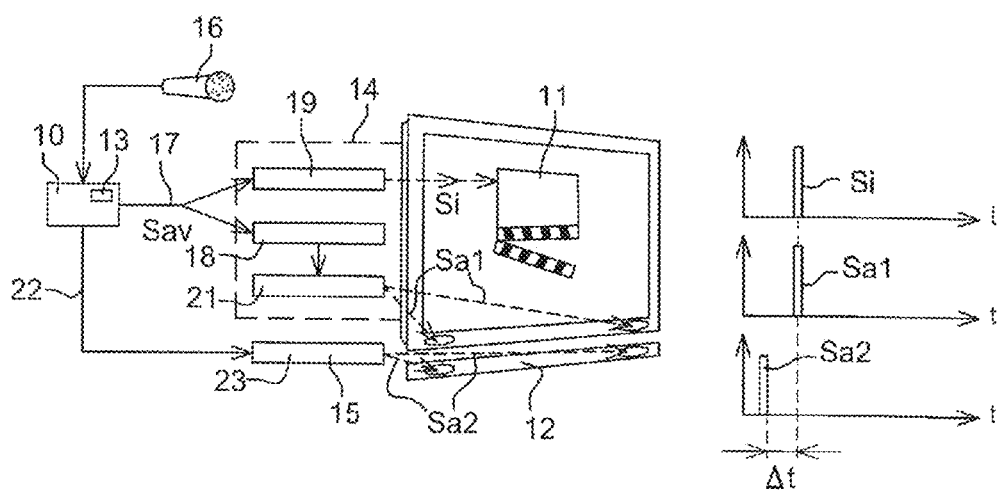
FIG. 3 is a figure equivalent to FIG. 2, with a microphone being integrated in the decoder unit.

With reference to FIG. 3, the synchronization method in a first implementation is performed in a system comprising a decoder unit 10, a TV set 11, and a sound bar 12 positioned under the TV set 11.

The decoder unit 10 has first processor means 13. The TV set 11 has second processor means 14. The sound bar 12 has third processor means 15.

The decoder unit 10 is connected to the TV set 11 and to the sound bar 12. The decoder unit 10 produces an original audio/video signal Sav that comprises an original audio signal and an original image signal. A microphone 16 is integrated in the decoder unit 10.

The original audio/video signal Sav is transmitted by the decoder unit 10 to the TV set 11 via a cable 17 of HDMI type. The second processor means 14 of the TV set 11 perform digital audio decoding processing 18 and digital video decoding processing 19 on the original audio/video signal Sav, thereby respectively producing an audio signal and an image signal Si. After the digital audio decoding processing 18, the audio signal is also subjected to synchronization processing 21 in order to be synchronized with the image signal Si. This produces a first audio signal Sa1.

The original audio signal is also transmitted by the decoder unit 10 to the sound bar 12 via an optical fiber connection 22 (some other connection could be used, e.g. any wired connection or any wireless connection). The third processor means 15 perform digital audio decoding processing 23 on the original audio signal so as to produce a second audio signal Sa2.

The loudspeaker of the TV set 11 thus plays back the first audio signal Sa1, while the sound bar 12 thus plays back the second audio signal Sa2, the first audio signal Sa1 and the second audio signal Sa2 both being derived from the same original audio signal included in the original audio/video signal Sav.

Figure 4:
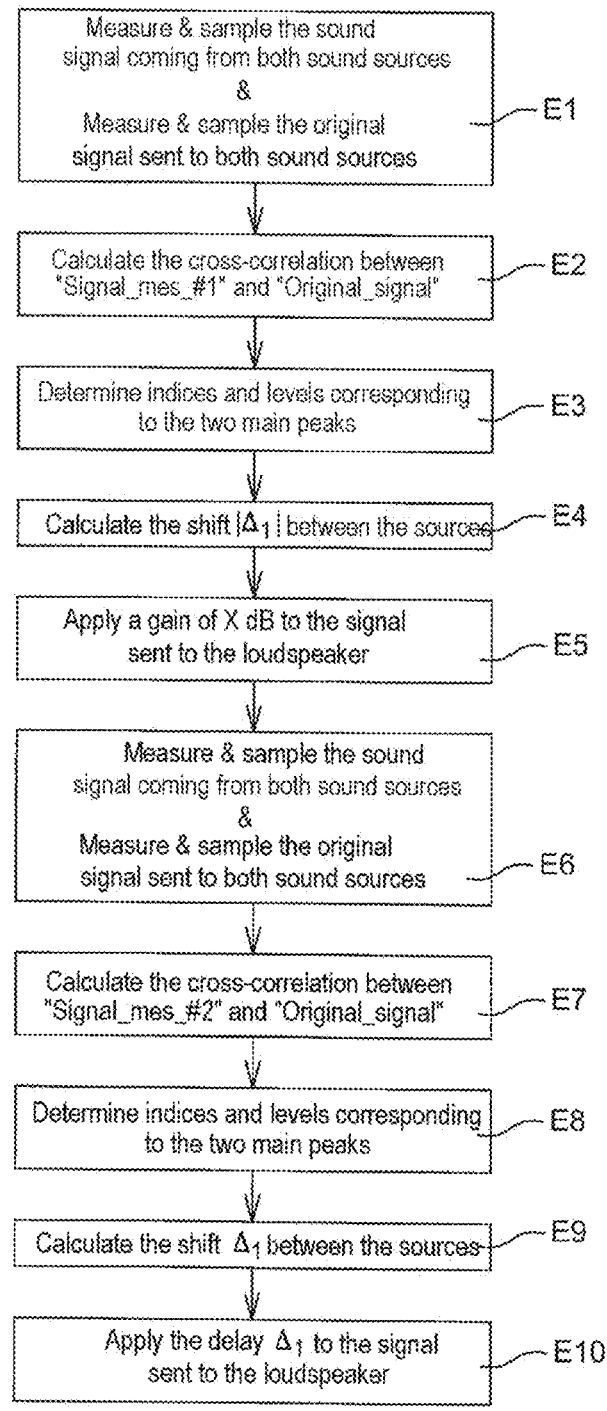
FIG. 4 shows the steps of a synchronization method in a first implementation of the invention.

The microphone 16 of the decoder unit 10 acquires the superposed sound signal that results from playing back the first audio signal Sa1 and the second audio signal Sa2. The first processor means 13 of the decoder unit 10 measure and sample the superposed sound signal. The first processor means 13 of the decoder unit 10 also measure and sample the original audio signal (step E1 of the synchronization method in the first implementation of the invention, as shown in FIG. 4).

Figure 5:
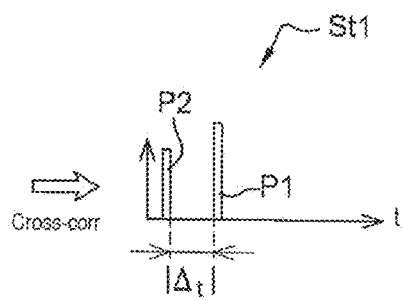
FIG. 5 shows a cross-correlation function obtained in the situation of FIG. 3.

Thereafter, with reference to FIG. 5, the first processor means 13 calculates a cross-correlation function for the superposed sound signal and the original audio signal (step E2), thereby obtaining a first processed signal St1.

It should be recalled that in general manner the interconnect function of a signal x(t) by a signal y(t) is defined as follows:

$$C_{xy}(\tau) = \int_{-\infty}^{+\infty} x(t) y^*(t-\tau) dt$$

The first processed signal St1 has two peaks P1 and P2. One of the peaks P1 corresponds to the first audio signal Sa1 while the other peak P2 corresponds to the second audio signal Sa2. The first processor means 13 thus measure the time position and the amplitude of each peak P1, P2 (step E3).

The first processor means 13 also calculates the time difference between the two peaks P1, P2, which is equal to the absolute value $|\Delta t|$ of the time shift $\Delta t$ between the first audio signal Sa1 and the second audio signal Sa2 (step E4).

In order to determine the sign of the time shift and thus define whether the first audio signal Sa1 is in advance on the second audio signal Sa2 or else, on the contrary, the second audio signal Sa2 is in advance on the first audio signal Sa1, the first processor means 13 act as follows.

Figure 6:
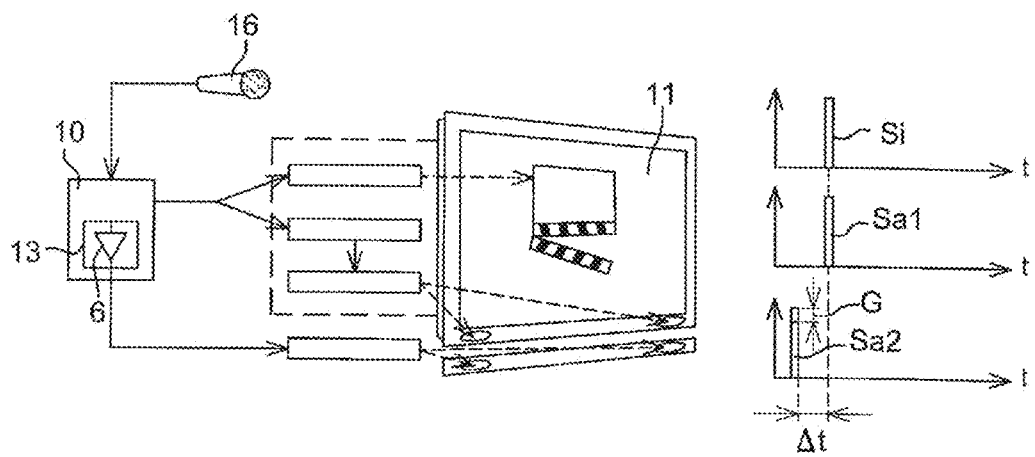
FIG. 6 is a figure equivalent to FIG. 3, with gain being applied to a second audio signal.

With reference to FIG. 6, the first processor means 13 apply temporarily a gain G to the amplitude of the second audio signal Sa2. Specifically, the gain G is applied each time there is a change of channel, for a period of a few milliseconds (step E5).

Thereafter, the microphone 16 of the decoder unit 10 acquires once more the superposed sound signal resulting from playback of the first audio signal Sa1 and of the second audio signal Sa2. The first processor means 13 measure and sample once more the superposed sound signal. The first processor means 13 also measure and sample once more the original audio signal (step E6).

Figure 7:
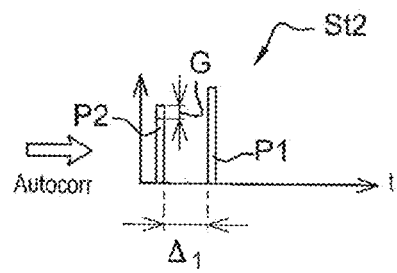
FIG. 7 shows an cross-correlation function obtained in the situation of FIG. 6.
Figure 8:
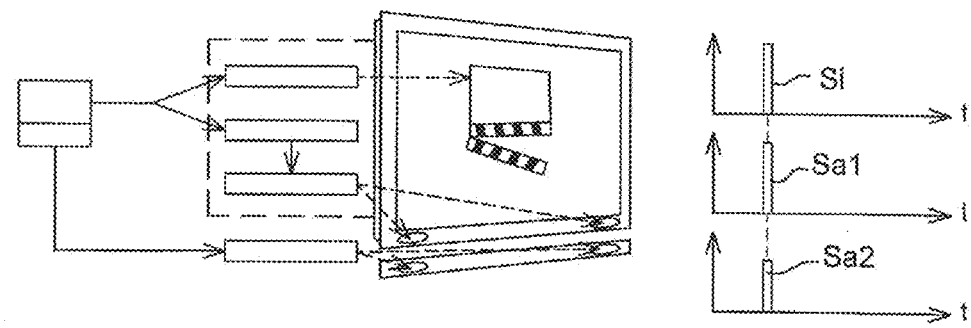
FIG. 8 is a figure equivalent to FIG. 3, in which the synchronization method in a first implementation of the invention is performed.

With reference to FIG. 7, the first processor means 13 calculate once more a cross-correlation function between the superposed sound signal and the original audio signal, thereby obtaining a second processed signal St2 (step E7).

The first processor means 13 then measure once more the amplitude of each peak P1, P2 of the second processed signal St2 (step E8).

Among the two peaks P1 and P2, a modified peak P2 presents an amplitude in the second processed signal St2 that was modified by a value equivalent to the gain G compared with its amplitude in the first processed signal St1. The modified peak P2 corresponds to the second audio signal Sa2, to which the gain G was applied by the first processor means 13.

The first processor means 13 thus estimate the sign of the time shift $\Delta t$, and they thus estimate the time shift $\Delta t$ itself (step E9).

The first audio signal Sa1 and the second audio signal Sa2 are then synchronized by applying to the second audio signal Sa2 a delay time or an advance time corresponding to the time shift $\Delta t$ (step E10).

Figure 9:
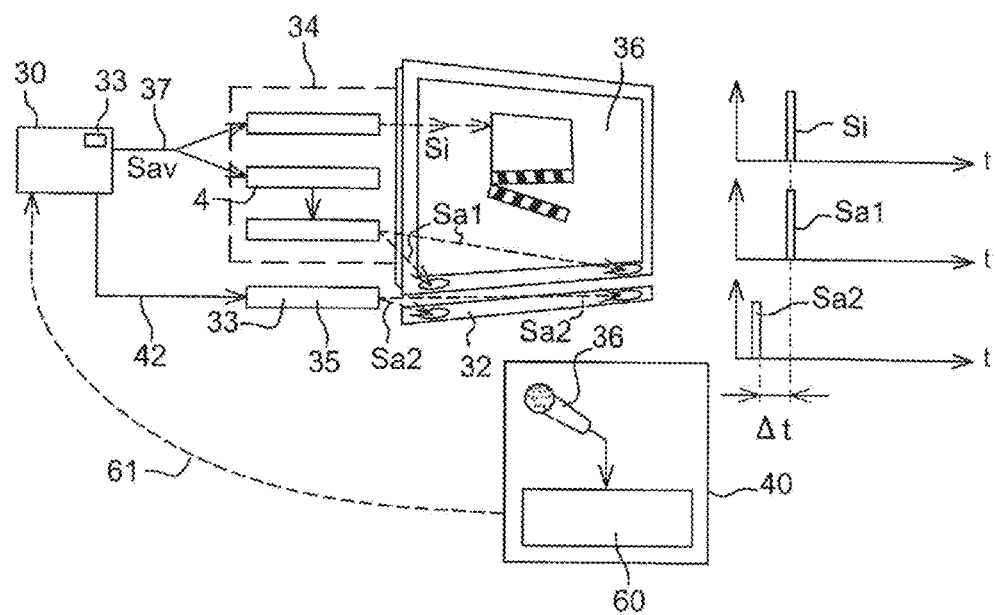
FIG. 9 is a figure equivalent to FIG. 2, a microphone being integrated in a remote control positioned in front of the TV set.

With reference to FIG. 9, the synchronization method in a second implementation is performed in a system comprising a decoder unit 30, a TV set 31, and a sound bar 32 positioned under the TV set 31.

The decoder unit 30 has first processor means 33. The TV set 31 has second processor means 34. The sound bar 32 has third processor means 35.

The decoder unit 30 is connected to the TV set 31 and to the sound bar 32. The decoder unit 30 produces an original audio/video signal Sav that comprises an original audio signal and an original image signal.

A microphone 36 is integrated in a remote control 40, which in this example is situated in front of the TV set 31. The remote control includes fourth processor means 60.

The remote control 40 and the decoder unit 30 communicate with each other with a wireless connection 61.

The original audio/video signal Sav is transmitted by the decoder unit 30 to the TV set 31 via a cable 37 of HDMI type. The second processor means 34 of the TV set 31 perform digital audio decoding processing 38 and digital video decoding processing 39 on the original audio/video signal Sav, thereby producing respectively an audio signal and an image signal Si. After the digital audio decoding processing 38, the audio signal is also subjected to synchronization processing 41 in order to be synchronized with the image signal Si. This produces a first audio signal Sa1.

The original audio signal is also transmitted by the decoder unit 30 to the sound bar 32 via an optical fiber connection 42 (some other connection could be used, e.g. any wired connection or any wireless connection). The third processor means 35 perform digital audio decoding processing 43 on the original audio signal, thereby producing a second audio signal Sa2.

The loudspeaker of the TV set 31 thus plays back the first audio signal Sa1, while the sound bar 32 thus plays back the second audio signal Sa2, the first audio signal Sa1 and the second audio signal Sa2 both originating from the same original audio signal contained in the original audio/video signal Sav.

Figure 10:
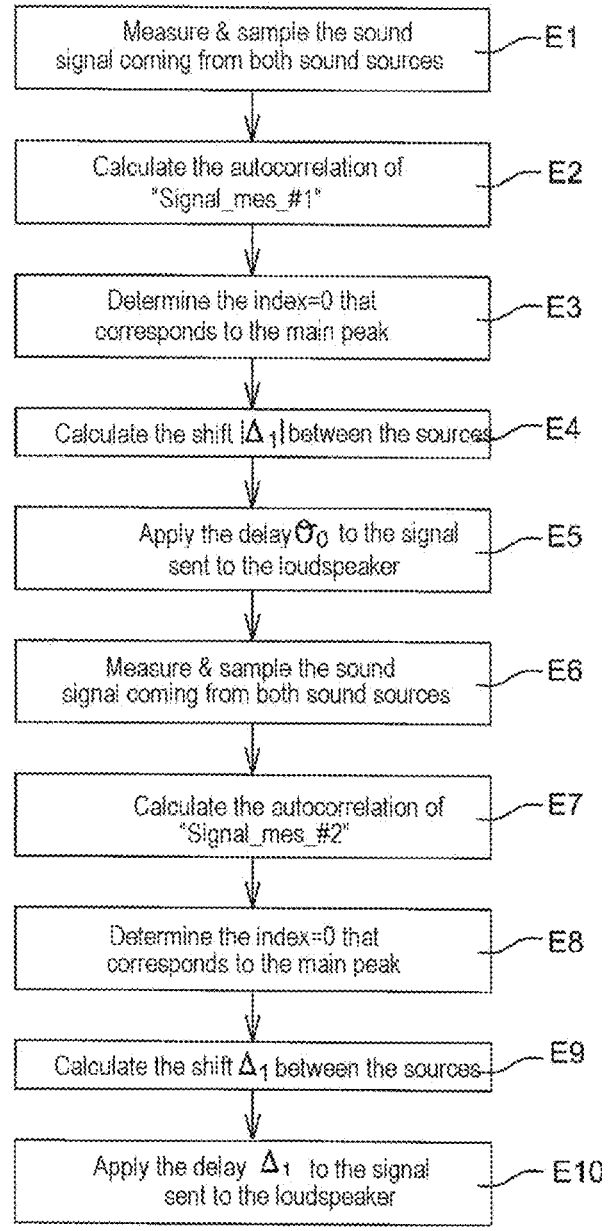
FIG. 10 shows the steps of a synchronization method in a second implementation of the invention.

The microphone 36 of the remote control 40 acquires the superposed sound signal resulting from playback of the first audio signal Sa1 and of the second audio signal Sa2. The fourth processor means 60 of the remote control 40 measure and sample the superposed sound signal (step E1 of the synchronization method in the first implementation of the invention, shown in FIG. 10).

Figure 11:
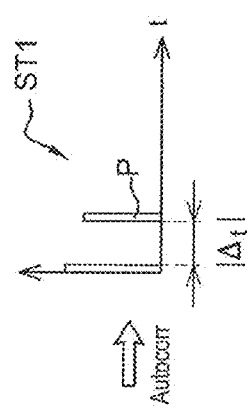
FIG. 11 shows an auto-correlation function obtained in the situation of FIG. 9.

Thereafter, with reference to FIG. 11, the fourth processor means 60 calculate an auto-correlation function of the superposed sound signal (step E2), thereby obtaining a first processed signal St1.

It should be recalled that in general manner the autocorrelation function of a signal x(t) is defined by:

$$C_{xx}(\tau) = C_x(\tau) = \int_{-\infty}^{+\infty} x(t)x^*(t-\tau)dt$$

The first processed signal St1 has a peak P. The fourth processor means 60 then measure the time position and the amplitude of the peak P (step E3).

The absolute value of the time position of the peak P is equal to the absolute value |Δt| of the time shift Dt between the first audio signal Sa1 and the second audio signal Sa2 (step E4).

In order to determine the sign of the time shift Δt and thus in order to define whether the first audio signal Sa1 is in advance on the second audio signal Sa2, or else, on the contrary, the second audio signal Sa2 is in advance on the first audio signal Sa1, the fourth processor means 60 and the first processor means 33 of the decoder unit 30 act as follows.

Figure 12:
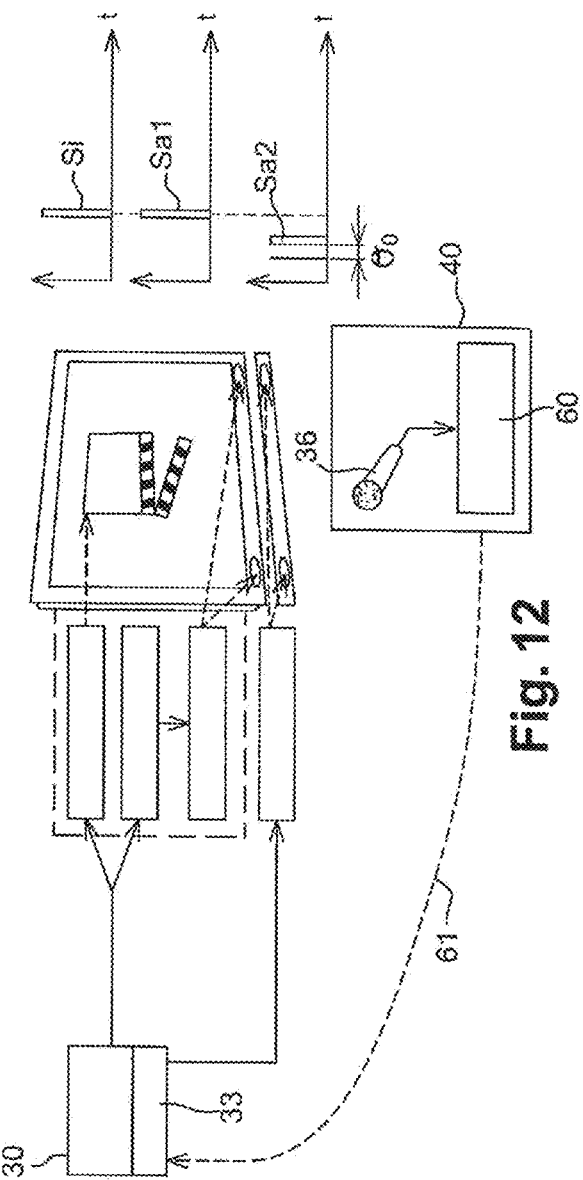
FIG. 12 is a figure equivalent to FIG. 9, with a predetermined delay being applied to the second audio signal.

With reference to FIG. 12, the first processor means 13 apply temporarily a predetermined delay $\theta_0$ to the second audio signal Sa2. Specifically, the predetermined delay $\theta_0$ is applied each time there is a change of channel, for a few milliseconds (step E5).

Thereafter, the microphone 36 and the remote control 40 acquire once more the superposed sound signal resulting from playback of the first audio signal Sa1 and of the second audio signal Sa2. The fourth processor means 60 measure and sample once more the superposed sound signal (step E6).

Figure 13:
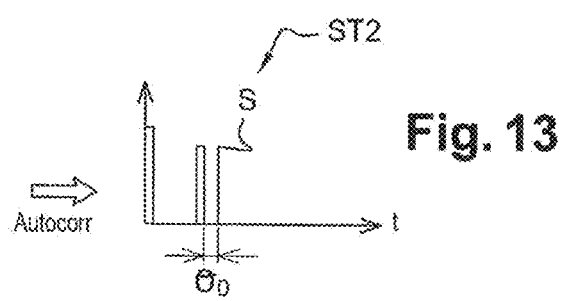
FIG. 13 shows an auto-correlation function obtained in the situation of FIG. 12.
Figure 14:
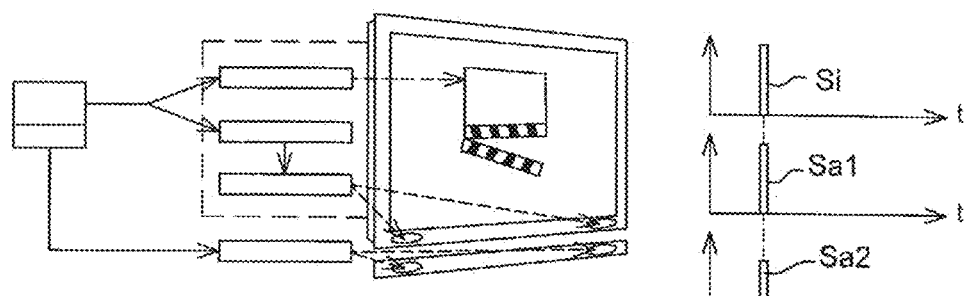
FIG. 14 is a figure equivalent to FIG. 9, in which the synchronization method in a second implementation of the invention has been performed.

With reference to FIG. 13, the fourth processor means 60 calculate once more an auto-correlation function of the superposed sound signal (step E7), and obtain a second processed signal St2.

The fourth processor means 60 then measure once more the time position of the peak P (step E8). A sign is obtained for the time shift by determining the direction of the shift S of the peak P in the second processed signal St2 relative to the first processed signal St1.

The fourth processor means 60 thus estimate the sign of the time shift Δt, and thus they estimate the time shift Δt itself (step E9).

The fourth processor means 60 then transmit the value of the time shift Δt to the first processor means 33 of the decoder unit 30 via the wireless connection 61.

The first audio signal Sa1 and the second audio signal Sa2 are then synchronized by applying to the second audio signal Sa2 a delay time or an advance time corresponding to the time shift Δt.

Figure 15:
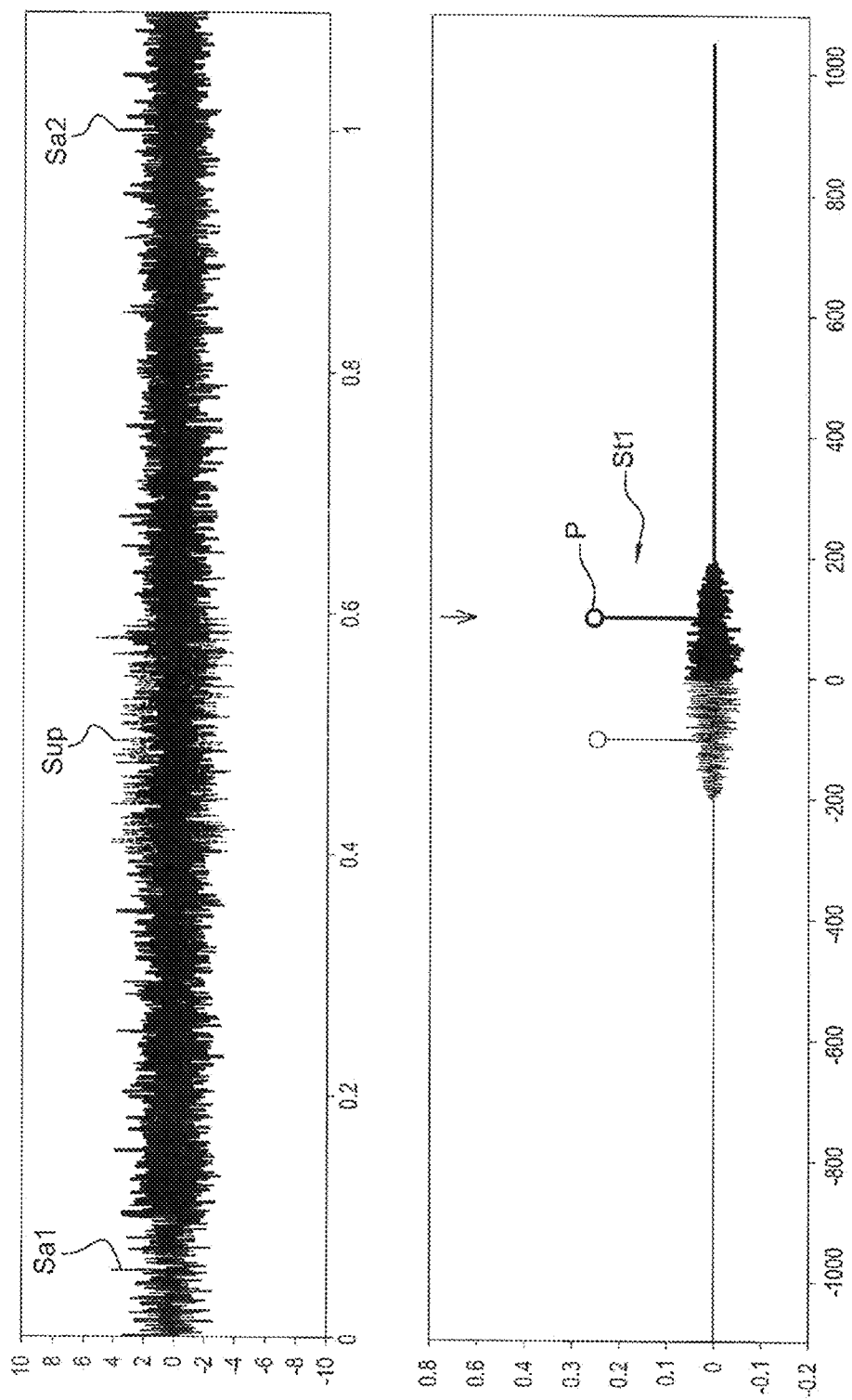
FIG. 15 comprises two graphs showing curves of a second audio signal, of a second audio signal delayed by a predetermined delay, of a superposed sound signal, and of a second processed signal.

FIG. 15 plots curves obtained by simulation to illustrate performing the synchronization method in the second implementation of the invention.

In FIG. 15, there can be seen the first audio signal Sa1, the second audio signal Sa2, the superposed audio signal Sup, and the first processed signal St1 obtained by the auto-correlation function. It can be seen that the second audio signal Sa2 presents a time shift of 100 milliseconds (ms) relative to the first audio signal Sa1. It can also be seen that the time position of the peak P, equal to 100 ms, does indeed correspond to the time shift.

Naturally, the invention is not limited to the implementations described but covers any variant coming within the ambit of the invention as defined by the claims.

Above, mention is made of first, second, and third processor means in the first implementation of the synchronization method of the invention, and of first, second, third, and fourth processor means in the second implementation of the synchronization method of the invention. It should be observed that these processor means could be positioned in other ways, e.g. in one or more additional units connected by any kind of connection to the decoder unit and/or to the TV set and/or to the sound bar and/or to the remote control.

In both implementations, the microphone could be positioned in other ways (e.g. in the decoder unit, in the second implementation).

Although the predetermined gain and delay are applied in the description above to the second audio signal, the predetermined gain and/or delay could be applied to the first audio signal.

It is specified that the term "gain" covers both positive gain and negative gain, and that "predetermined delay" covers a predetermined time shift that may be positive or negative (i.e. a predetermined advance time or a predetermined delay time).

The invention claimed is:

1. A synchronization method for synchronizing a first audio signal played back by a first sound playback device with a second audio signal played back by a second sound playback device, the first audio signal and the second audio signal being derived from a single original audio signal, the method comprising the steps of:
    measuring a superposed audio signal resulting from playing back the first audio signal and the second audio signal;
    processing the superposed audio signal in order to obtain a first processed signal, the processing comprising calculating a cross-correlation function or an auto-correlation function;
    from the first processed signal, estimating an absolute value for a time shift between the first audio signal and the second audio signal;

modifying at least one characteristic of the first audio signal or of the second audio signal;

measuring the superposed sound signal once more;

performing processing once more on the superposed sound signal in order to obtain a second processed signal;

estimating the sign of the time shift from the second processed signal;

synchronizing the first audio signal and the second audio signal by applying to the first audio signal or to the second audio signal a delay time or an advance time corresponding to the time shift.

2. The synchronization method according to claim 1, wherein the first sound playback device is integrated in an audio/video playback device, and wherein the original audio signal is included in an original audio/video signal produced by an audio/video source connected to the audio/video playback device and to the second sound playback device.

3. The synchronization method according to claim 1, wherein the processing consists in calculating a cross-correlation function between the superposed sound signal and the original sound signal, and wherein the absolute value of the time shift is obtained from a time difference between two peaks of the first processed signal.

4. The synchronization method according to claim 3, wherein the modification to at least one characteristic of the first audio signal or of the second audio signal consists in applying temporarily a gain to the amplitude of the first audio signal or of the second audio signal.

5. The synchronization method according to claim 4, wherein the sign of the time shift is obtained by identifying among the two peaks of the first processed signal, a modified peak (P2) of amplitude that has been modified in the second processed signal by a value equivalent to the gain compared with its amplitude in the first processed signal.

6. The synchronization method according to claim 1, wherein the processing consists in calculating an auto-correlation function of the superposed sound signal, and wherein the absolute value of the time shift is obtained from the position of a peak in the first treated signal.

7. The synchronization method according to claim 6, wherein the modification of at least one characteristic of the first audio signal or the second audio signal consists in applying temporarily a predetermined delay to the first audio signal or to the second audio signal.

8. The synchronization method according to claim 7, wherein a sign of the time shift is obtained by determining the direction of the shift of the peak in the second processed signal relative to the first processed signal.

9. A system comprising an audio/video source, an audio/video playback device, a first sound playback device integrated in the audio/video playback device, a second sound playback device, and processor means that perform the synchronization method according to claim 1.

10. The system according to claim 9, wherein the audio/video source is a decoder unit, the audio/video playback device is a TV set, and the second sound playback device is an external loudspeaker, such as a sound bar.

11. A decoder unit including a microphone, connection means for connecting to a first sound playback device and to a second sound playback device, and processor means that perform the synchronization method according to claim 1.

12. A computer program including instructions enabling a decoder unit to perform the synchronization method according to claim 1.

13. Storage means, wherein they store a computer program including instructions enabling a decoder unit to perform the synchronization method according claim 1.

* * * * *